US007383155B2

(12) United States Patent
Rosam et al.

(10) Patent No.: US 7,383,155 B2
(45) Date of Patent: Jun. 3, 2008

(54) PERFORMANCE ANALYSIS AND ASSESSMENT TOOL AND METHOD

(76) Inventors: Ian Mark Rosam, 5 Rowan Avenue, Mawsley, Kettering, Northamptonshire (GB) NN14 1GP; Robert Clive Peddle, Quinta das Sesmarias, Sitio de Fornalha, Moncarapacho (PT) OLHAO 8700-091

( * ) Notice: Subject to any disclaimer, the term of this patent is extended or adjusted under 35 U.S.C. 154(b) by 205 days.

(21) Appl. No.: 11/155,153

(22) Filed: Jun. 17, 2005

(65) Prior Publication Data
US 2006/0206287 A1  Sep. 14, 2006

(51) Int. Cl.
 *G06F 3/01* (2006.01)
(52) U.S. Cl. .............. 702/182; 702/179; 702/183; 702/186
(58) Field of Classification Search .............. 702/57, 702/81, 119, 120, 179, 182, 183, 186; 705/1; 709/203; 717/174
See application file for complete search history.

(56) References Cited

U.S. PATENT DOCUMENTS 5,999,908 A * 12/1999 Abelow .................. 705/1
6,606,744 B1 * 8/2003 Mikurak ................. 717/174
6,904,449 B1 * 6/2005 Quinones ................ 709/203
2004/0225649 A1 * 11/2004 Yeo et al. ................ 707/3

* cited by examiner

*Primary Examiner*—Eliseo Ramos-Feliciano
*Assistant Examiner*—Felix Suarez
(74) *Attorney, Agent, or Firm*—Alan G. Towner, Esq.; Pietragallo Gordon Alfano Bosick & Raspanti, LLP (57) ABSTRACT

The invention provides a tool and method for monitoring and evaluating any industrial or commercial process, activity or system or the personnel carrying out that process, activity or system against a set of Performance Drivers for the process, activity or system; and for assessing the efficiency, capability or sustainability of that process, activity or system as a result of the monitoring. By utilizing both a weighting between each of the different statements and questions used to derive performance and compliance data from persons polled for input and a numerical maturity value given to the mean responses from different groups of those persons polled, the analysis of the data against the associated Performance Drivers permits the generation of assessment reports that assess compliance against individual statements and indicate the potential cause of any failure of the process, activity or system to attain its targets.

15 Claims, 7 Drawing Sheets

Edit Indicators

Assessment | Warehousing, Storage & Processing assessment

| List of Assessments>> | Assessment (166)>> | Setup clauses (Top Level)>> | Setup questions>> | Setup Indicators |
| --- | --- | --- | --- | --- |
| | Setup Groups>> | Customise>> | | |

[add new Indicator]

page 1 | 2 |

Assessments
- Products
- Questions
- Purchased Products
- Assessment
- Reports
- Questions Use Report Edit Users
Edit Administrators
Edit Services Add News
Edit News
Top Ten Types
Top Ten
Special Interest Groups

| Number | Indicator | | |
| --- | --- | --- | --- |
| 1 | The Process is carried out safely | edit | delete |
| 2 | Stock records are maintained and accurate | edit | delete |
| 3 | Stock is available for delivery when needed | edit | delete |
| 5 | Stock is processed when needed | edit | delete |
| 6 | Stock is protected during storage | edit | delete |
| 7 | Stock levels are maintained | edit | delete |
| 8 | Stock levels are appropriate for the business | edit | delete |
| 9 | The process is managed | edit | delete |
| 10 | Stock is processed accurately | edit | delete |
| 11 | The process is measured and the results communicated | edit | delete | page 1 | 2 |

Figure 4 the hpo

Add News
Edit News
Top Ten Types
Top Ten
Special Interest Groups

Assessments
Products
Questions
Purchased Products
Assessment
Reports
Questions Use Report Edit Users
Edit Administrators
Edit Services

Question

The correct stock is allocated.

☑ manage a part of it.
☐ manage it all.
☐ provide guidance/advice.
☐ receive something from it.
☑ supply something to it.
☐ work within it.

Compliance Item
☑

Update record

Responses Area

| Delete | | Response | Value | Order |
|---|---|---|---|---|
| ☐ | 1 | Usually ordered stock is correctly allocated with few errors or omissions. | 2 | 0 |
| ☐ | 2 | Sometimes mistakes are made that cause real problems for our customers. | 1 | 1 |
| ☐ | 3 | Rarely is stock returned or lorries unloaded because the wrong stock has been sent/loaded. | 5 | 2 |

Delete

Figure 5

Assessment Links Report of *Warehousing, Storage and Processing Process assessment*

| Quest No | Question | Resp 1 | Resp 2 | Resp 3 | Resp 4 | Resp 5 | Resp 6 | supply something to it | manage a part of it | manage it all | work within it | provide guidance / advice | receive something from it |
|---|---|---|---|---|---|---|---|---|---|---|---|---|---|
| 245 | The correct stock is allocated to each order. | Rarely is stock returned or lorries unloaded because the wrong stock has been sent / loaded. | Pre-agreed replacement stock is used when ordered stock is unavailable so that deliveries can take place as planned. | Sometimes mistakes are made that cause real problems for our customers. | Quite often there are errors in allocating the correct stock to the order. | Usually ordered stock is correctly allocated with few errors or omissions. | | | yes | | yes | | |
| | maturity of reply | 5 | 3 | 1 | 0 | 2 | | | | | | | |
| | Indicators linked | 12 Process activities takes place / Weight: 100 | | | | | | | | | | | |
| | | 9 The process is managed / Weight: 100 | | | | | | | | | | | |
| | | 2 Stock Records are maintained and accurate / Weight: 100 | | | | | | | | | | | |
| | | 5 Stock is processed when needed / Weight: 50 | | | | | | | | | | | |

Figure 6a

Assessment Links Report of Warehousing, Storage and Processing Process assessment

| Quest No | Question | Resp 1 | Resp 2 | Resp 3 | Resp 4 | Resp 5 | Resp 6 | supply something to it | manage a part of it | manage it all | work within it | provide guidance / advice | receive something from it |
|---|---|---|---|---|---|---|---|---|---|---|---|---|---|
| 500 | Information needed to prepare materials for delivery is clear and complete | Sometimes the picking information needs clarifying before the order can be picked. | Picking information is normally sufficient to prepare the order. | Orders are always checked to confirm they have been picked correctly. | Often picking information is either unavailable or unclear. | Special picking requirements are always clearly shown on the order. | | | yes | | yes | | |
| | maturity of reply | 1 | 2 | 5 | 0 | 3 | | | | | | | |
| | Indicators linked | 12 Process activities takes place / Weight: 100 | | | | | | | | | | | |
| | | 9 The process is managed / Weight: 100 | | | | | | | | | | | |
| | | 8 Stock is available for delivery when needed / Weight: 100 | | | | | | | | | | | |
| | | 2 Stock Records are maintained and accurate / Weight: 50 | | | | | | | | | | | |
| | | 5 Stock is processed when needed / Weight: 20 | | | | | | | | | | | |

Figure 6b

PERFORMANCE ANALYSIS AND ASSESSMENT TOOL AND METHOD

FIELD OF THE INVENTION

The invention relates to the monitoring and evaluation of any industrial and commercial processes, activities or systems and the personnel carrying these out, to assess their effectiveness, efficiency, level of development and compliance, by producing a risk and/or compliance profile based on a collection of Performance Indicators against any set of Performance Drivers relevant to the scope of the assessment. By "Performance Drivers" there is meant any standard, framework, set of 'best practice' principles, methods or competencies, defined process parameters or other criteria to which the process, activity or system must adhere if it is to be most effective. By "Performance Indicators" there is meant any perceivable or measurable indication of the level to which the Performance Drivers and the activity related to the Performance Drivers and hence the process activity or system is achieving the intended result. The scope of the assessment embraces any industrial or commercial process, activity or system and the personnel carrying out that process, activity or system, which definition is broad enough to embrace any organisation, individual or team, or the relationships between different entities, such as an organisation, its people, customers and suppliers. The invention provides an analysis and assessment tool which enables information drawn from people in different areas of responsibility and different geographic locations to be automatically collated and analysed in a reliable, consistent and accurate manner to report simultaneously against one or more of the defined Performance Drivers either individually or in combination. The invention also provides a method of using the above analysis and assessment tool to monitor and improve the performance of an organisation, individual or team, the efficiency or effectiveness of a manufacturing or commercial process, activity or system or the effectiveness of relationships between different entities, such as an organisation, its people, customers and suppliers. The invention also provides a computer readable medium or a carrier wave for enabling the above method, including means for generating screen prompts for enabling a computer operator to program into a central processor unit a plurality of pre-defined protocols to be followed in order that the industrial or commercial process, activity or system should comply with the Performance Drivers, and for enabling a computer operator to collect, through at least one remote terminal that is accessible by the central processor unit, performance and compliance data from people distributed between a diverse number of groups all involved with or having an interest in the effects and results of the industrial or commercial process, activity or system.

BACKGROUND ART

Many organisations and industries use management systems, standards and frameworks to enable management to specify and achieve a number of key effectiveness, efficiency and/or compliance objectives. An organisation may seek compliance with ISO9001/2000, or some other standard, framework or internally defined requirement, such as a process or a work instruction. At a production monitoring and control level an industrial manufacturing process may seek compliance with a quality management system in which a plurality of predefined production protocols have to be followed in order to achieve a consistent product specification or performance, or to maximise the profitability, effectiveness or other objective of a manufacturing or commercial process.

Traditionally, once the manner of the delivery of a requirement has been devised and its implementation laid down, normally as a range or sequence of processes or procedures to be carried out by a workforce, the monitoring of the organisation or the production control in order to assess compliance with those processes or procedures is by a manual survey or audit. There is no meaningful or consistent cross-correlation between the results of that survey/audit and other aspects or requirements of the industrial or commercial process, such as a set of relevant Performance Drivers or Indicators. Such assessment of the organisation's defined requirements has not previously been automatically or consistently carried out, analysed and reported as it has not been technically feasible to achieve this, mainly because of the different skills, competence, experience, perceptions and attitude of the people involved and the lack of the existence of any tools for the consistent collection of adequate in-depth evidence or data. The result has been that these audits/surveys have always been simply to assess compliance with the target standard, the framework or the internally defined requirement, in the expectation that improvement or maintenance of production and other organisational targets will follow as measured, for instance, by turnover, quality or profitability of the manufacturing process or of the industrial or commercial organisation. Current methods that purport to do this do not apply the rigour of the invention to all parts of the process used, even though some elements may appear to provide consistency of approach (e.g. the consistent use of a spreadsheet that is populated with numbers, which are assessed rather then consistently created, leads to reduced value and both a perception and possible reality of inaccuracy of the output).

THE INVENTION

The invention provides a performance analysis assessment tool as defined in claim 1. The invention also provides a performance analysis assessment method as defined in claim 13; a computer readable medium as defined in claim 14; and a carrier wave as defined in claim 15 herein.

The assessment tool and method of the invention enable consistent judgements and assessments to be made even over prolonged periods so that the tool is four-dimensional in its function (time being the fourth dimension in this context), eliminating a potential inconsistency between the personal views and preconceptions of individual auditors or groups of auditors. The assessment tool and method are based on a number of related principles, as summarised under 'A' to 'F' below.

A. A set of Performance Drivers is identified for the Scope Of The Assessment. In the case of a company working to a predefined standard such as ISO9001/2000 this may be the wording of the standard itself. Alternatively it may be a set of rules, values, behaviours, procedures and objectives laid down within the organization. This set of Performance Drivers may vary depending on the company or organisation or the criteria to be met within the scope of the assessment. This set of Performance Drivers should also be such that participants in the assessment are either affected by or can themselves affect one or more them. Any number of such Performance Drivers may be identified for the given scope of the assessment.

B. Working from the Performance Drivers identified in A above, a set of assessment topics is defined for each of which one or more statements are defined each with a range of Performance Indicators. Numerical values can be assigned to the Performance Indicators. The maximum number or percentage that each Performance Indicator could possibly achieve (e.g. 100%) will reflect the highest possible attainment of performance against the set of Performance Drivers. For example for a given manufacturing process the assessment topics may be focussed on:

- stock control
- product specification
- product reliability
- consistency of product performance
- product unit cost
- waste management
- pollution control and conservation of the environment; and
- many other issues or stakeholder requirements, each giving rise to a possible range of Performance Drivers or Indicators.

C. The identification of the plural groups of people intended to assess performance or compliance should be made in conjunction with the creation of the Performance Indicators as set out in B above. Preferably the plural groups of people able to assess the performance and compliance data should include the entire workforce or a cross-section of the entire workforce involved in the industrial or commercial process divided into statistically significant groups, together with users of the products produced by the industrial or commercial process, activity or system, suppliers, regulators or any people, stakeholders, interested parties or organisations affected by the process, activity, system or product. As far as possible the groups should be chosen which could contribute the widest range of knowledge and perception of the behaviours and activities they see or experience. These groups can then provide assessments of different aspects of the performance and compliance data consistent with their knowledge and expertise of the industrial or commercial process or the product of that process. Typical plural groups of people could include:

- those who manage the whole of the process, activity or system
- those who manage a part of the process, activity or system
- those who provide guidance or support to the process, activity or system
- those who receive or use the product of the process, activity or system
- those who supply something used within the process, activity or system
- those who work within the process and operate the process, activity or system D. The assessment information to be provided by the plural groups of people identified in C above is generally in the form of answers or responses to the above set of predefined statements identified in B above. Typically each of the people being polled for an assessment will be given a subject to think about, the series of statements or questions and a series of responses or Performance Indicators to each statement or question from which to choose a 'best fit' response. The responses are gathered using a graphical user interface at the central processor unit or at the or each remote terminal. This method of gathering responses is greatly facilitated by the Internet which may form the connection between the remote terminal or terminals and the central processor unit. The statements, questions and responses or indicators are phrased with direct relevance to the user groups and to the Performance Drivers with which they have knowledge or expertise. The possible Performance Indicators or responses are selected to reflect different levels of maturity, each of which is indicative of a specific experience, behaviour, knowledge or activity related to each statement, in a range from very low maturity to very high maturity. In turn these would contribute increasing amounts to the attainment of the maximum figure for the Performance Indicator. Each possible response is given a numerical value related to its level of maturity. Each statement or question includes options for the user to select either a single response or multiple responses. The option of also entering free text comments is also available where appropriate. Wherever possible the responses offered to the plural groups of people being polled should be behavioural based; i.e. describing an outcome of a situation or event as observed by the person being polled, as the possibility of exposing simply the personal opinion or prejudice of the person giving the response is thereby minimised. Preferably the responses are presented to the users in a random order, as opposed to always showing the response with the highest weighting at the top, or first, of a list of alternatives; or always showing the response with the highest weighting at the bottom, or last, of the list of alternatives.

The replies given by the persons polled or questioned for each statement or question can be averaged to provide a Performance Indicator for that statement or question for that group. For example, if the numerical values given to the responses on offer, to indicate their levels of maturity, range from 0 to 5 then a numerical average of the varying maturities of a number of responses from different individuals can be calculated. That numerical average could be regarded as a 'mean response'. This is what happens in normal 'surveys' which usually stop here with the analysis, providing reports against individual or groups of statements or questions. The essence of the invention is that it goes much further than this, as described in the other parts of this specification.

E. The processing of the information gathered involves both establishing a link between each statement or question identified in B above and one or more of the Performance Drivers identified in A above, and establishing a weighting between each statement or question and each Performance Driver with which it is so linked. The weighting should reflect a subjective or objective assessment of the importance of the Performance Driver to the performance of the scope of the assessment and should also reflect a subjective or objective assessment of the relevance of the statement or question and thus of the mean response to that statement or question to attainment of that Performance Driver. For example if the topic on which the user groups are being polled relates to the satisfactory performance of a product made by an industrial process, the weighting of the link between a statement or question on that topic and a Performance Driver about 'Customers are satisfied by the products made' could be high, but a mean response which indicates that the product is no more than adequate for the job for which it is sold would carry a relatively low numerical maturity value in comparison with a mean response which indicates that the product is the best in its class. The interaction between the maturity value of the mean response to each statement or question and the weighting of the link between that statement or question and the linked Performance Driver or Drivers enables the analysis of the accumulated response information to be both accurate and reliable as an indicator of risk, compliance and hence performance. This interaction is carried out on a one-to-many basis in the analysis, because in most cases a statement or question is linked to one or more Performance Drivers, potentially weighted differently for each one.

F. The analysis of the accumulated responses made is carried out using the values or the mean maturity values of the responses, the linkage of the statements and mean responses to the Performance Drivers and the weightings set for these linkages. Responses which describe a high level of maturity have a greater effect on the outcome of the analysis. The analysis can then be presented in terms that indicate the level of maturity against the Performance Drivers, both overall and benchmarking between the groups of people defined within the scope of the assessment who have responded, together with any low or non-conformances that are indicated. For example if a company has a group of employees in France contributing to a total venture which involves manufacture of a product in England (for example the French employees making one component of a complex product) then it may be very significant if the final report can show whether those French employees made performance assessments in any way statistically different from the same assessments made by the English employees.

The final report can be made automatically by the assessment tool according to the invention, because the accumulated weighted performance achievement data is essentially numerical information. Moreover the analysis of the numerical data can be programmed so that successive reports are presented in a totally consistent format using a totally consistent analysis method. By keeping the analysis constant it is possible to compare a report created by using the tool of the invention one year with a report created by using the tool of the invention the following year. The two reports will be based on the same set of statements and response options given to the same target groups in successive years, and will therefore be completely self-consistent in their analysis of the data so that a manager of the company or a manager in charge of a production process can compare the current year's report with those for previous years, in order to try to assess in meaningful fashion the effect on output which has been brought about by, for example, an acquisition of new plant, materials or production practices.

EXAMPLE

The following example illustrates the invention. The performance analysis tool of the invention is explained as a tool for the evaluation of the value added by given investments in a particular company. The company manufactures and sells a range of general steel products including strip mill and stainless steel stock and specialist products. The company also runs steel processing facilities. The entire range of company activities spans a number of industrial and commercial manufacturing and operating processes. The company has 29 sites spread around the United Kingdom.

Historically, company performance audits involved instructing auditors on the key aspects of company activity and receiving reports from the auditors. That has been found to be unsatisfactory because of a lack of understanding by some of the auditors of the company's processes or core business, and an inconsistency between the essentially subjective observations of different teams of auditors. Using the tool of the invention, a more meaningful report can be created, and furthermore the reports from one year can be compared with reports in subsequent years secure in the knowledge that the reader would be comparing like with like.

Creating the Assessment Tool

The steps in creating the assessment tool are as set out in the accompanying drawings of which.

First of all the standards, the frameworks, the 'best practice' principles and the performance drivers of the process have to be studied and understood. In this example we will concentrate on only the warehousing, storage and processing of the raw materials from which the company products are made and the warehousing, storage and processing of the company's finished products. That is not to mean that the ultimate audit tool as developed for this particular company would not include a monitoring of the manufacturing processes themselves; it is merely that the simplified illustration which concentrates on warehousing alone can omit details of those specific processes and will therefore be easier to understand. Similar sets of Performance Indicators would in practice be derived for all other processes within the overall range of manufacturing and operating processes run by the company. From the above analysis it is possible to identify areas where, within each process, the highest risk of failure might exist.

Figure 1:
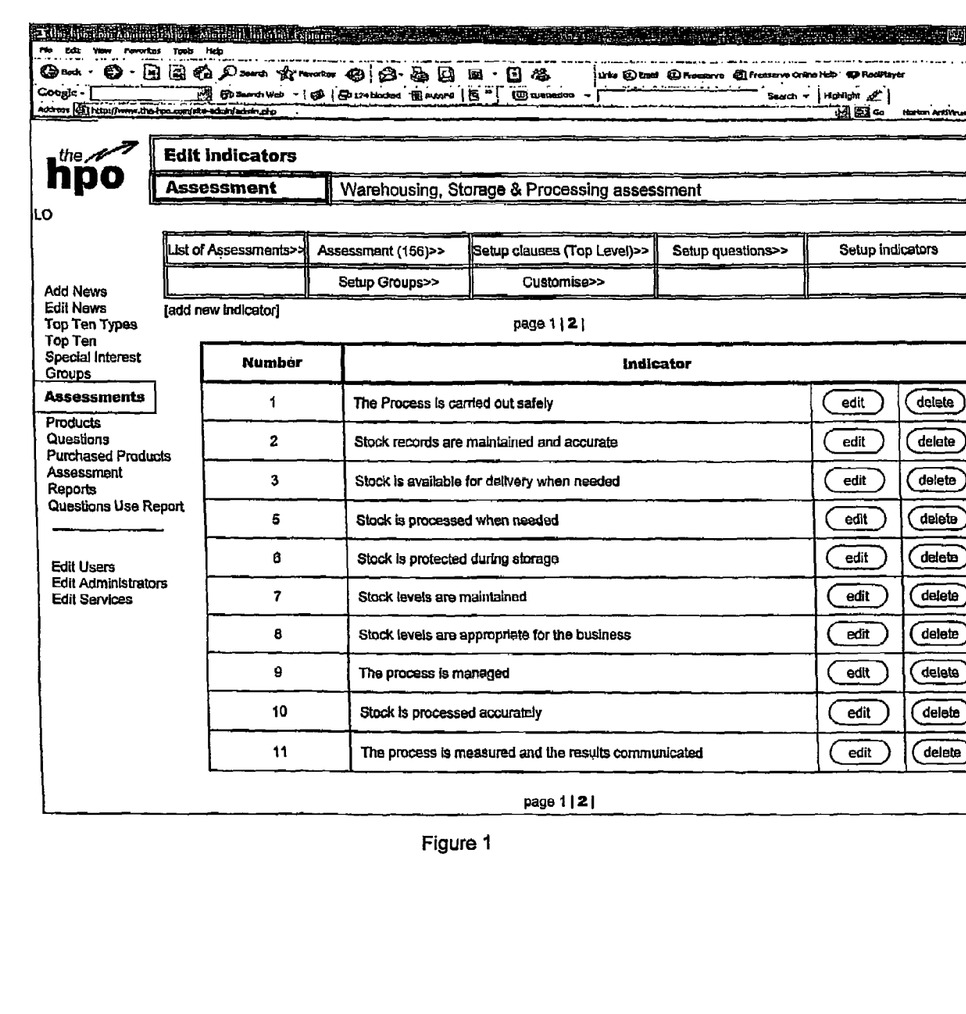
FIGS. 1 to 5 are screen samples from a graphical user interface from which the essential parameters of this particular company and its product range are programmed into the central processor unit.

From the analysis of the warehousing aspects of the process, the following Performance Drivers could be derived:

The process is carried out safely
Stock records are maintained and accurate
Stock is available for delivery when needed
Stock is processed when needed
Stock is protected during storage
Stock levels are maintained
Stock levels are appropriate for the business
The process is managed
Stock is processed accurately
The process is measured and results communicated
Process activities take place
Machinery and facilities are appropriate
Waste is minimised The person or team setting up the assessment can use the screen shown in FIG. 1 to input the above Performance Drivers. The last three would be input on a continuation page from that screen.

Next, the personnel groups are identified who will each have a view on the above aspects of the performance of the process. The identification of plural groups of such people the system enables a three-dimensional view (not just a 360°) view to be obtained. In this case the groups were agreed as:

those who manage a part of it (meaning any leader or manager at any level)

those who manage it all (meaning any person with overall responsibility)

those who provide guidance or support (meaning any internal or external provider of regulatory or statutory advice, management support or resource used in the process)

those who receive something from the process (meaning internal or external customers or users of the product or service)

those who supply something to or for the process (meaning internal or external suppliers to the process)

those who work within the process (meaning those people from across the organisation who work in the process to produce and deliver the products and services)

Figure 2:
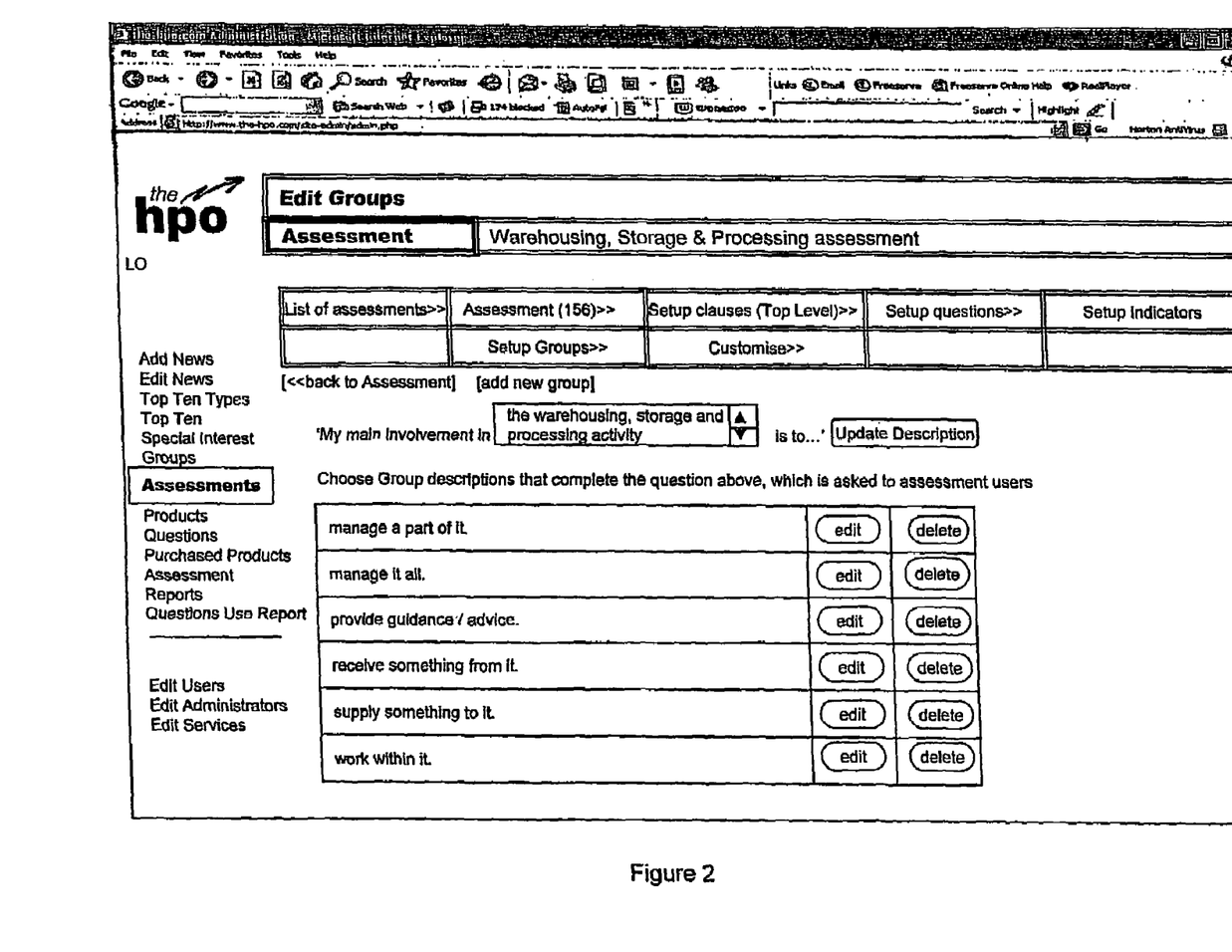

The person or team setting up the assessment uses the screen shown in FIG. 2 to enter the above six groups of people (or any other plurality of groups appropriate to the particular process and organization).

Figure 3:
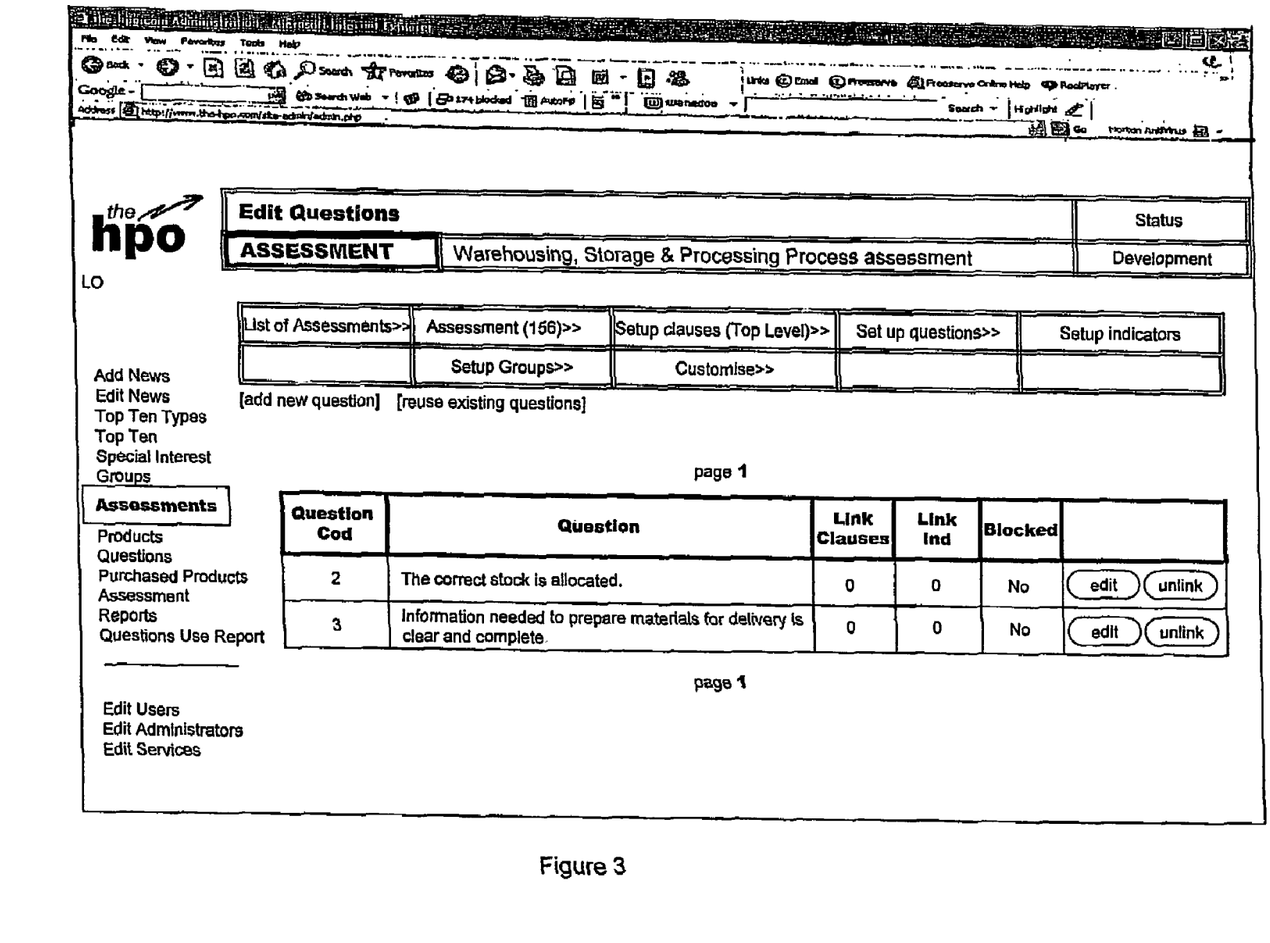

Next, the person or team setting up the system must create a number of statements, questions or topics relevant to each aspect of the activities in the process. Each statement, question or topic will ultimately be presented to one or more of the groups of people identified above. FIG. 3 shows a screen display which may be used in the creation of the range of statements. It has already been completed partially by the inclusion of two statements, questions or topics: "The correct stock is allocated" (i.e. to each order) and "Information needed to prepare materials for delivery is clear and complete". These statements are however random examples of a range of statements or questions that are needed to cover the full scope of the assessment, which would be formulated for any fully worked system. They anticipate behavioural based responses which reflect that which would be seen perceived or observed as that which is happening around them by the groups of people who will ultimately be polled for their responses.

Figure 4:
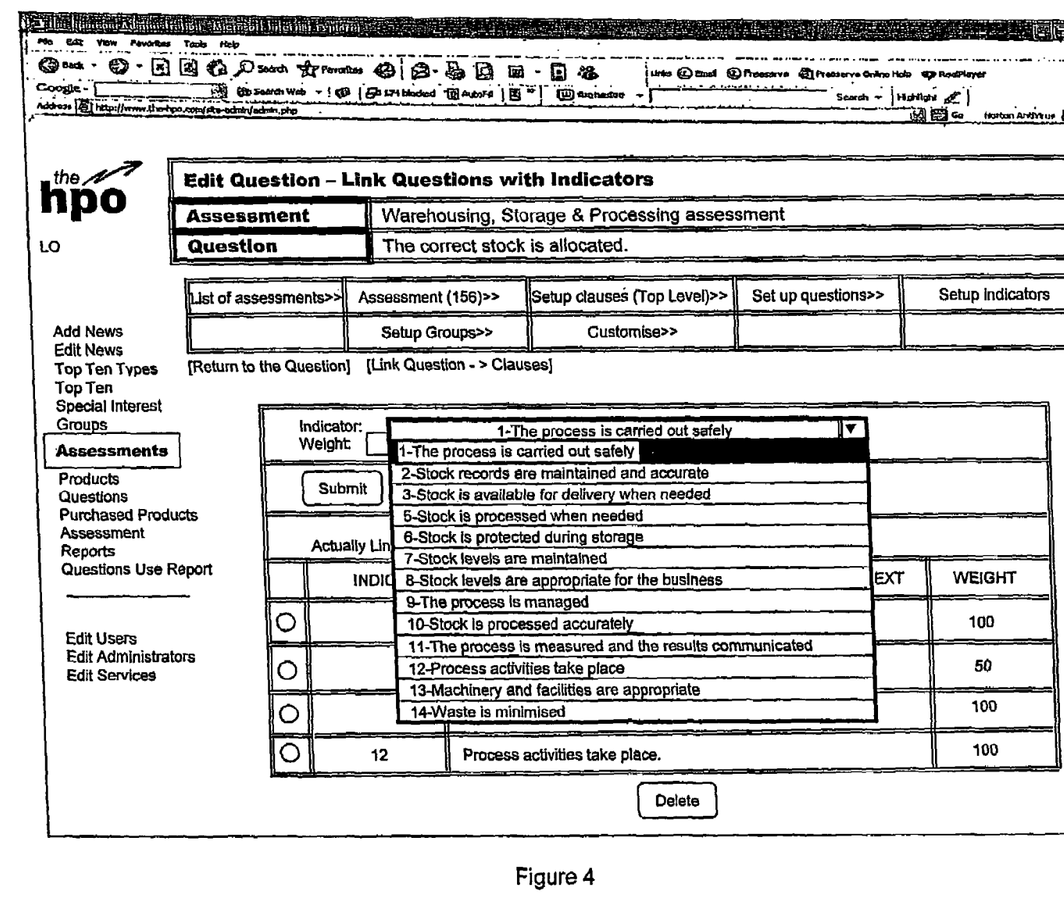

Next, each question or statement is linked to one or more Performance Drivers to which it is relevant and each link is given a weighting, as a numerical value from for example 0 to 100, indicating a proven or subjective assessment of the importance of that question or statement to the linked Performance Driver. That can be achieved using the screen shown in FIG. 4.

Figure 5:
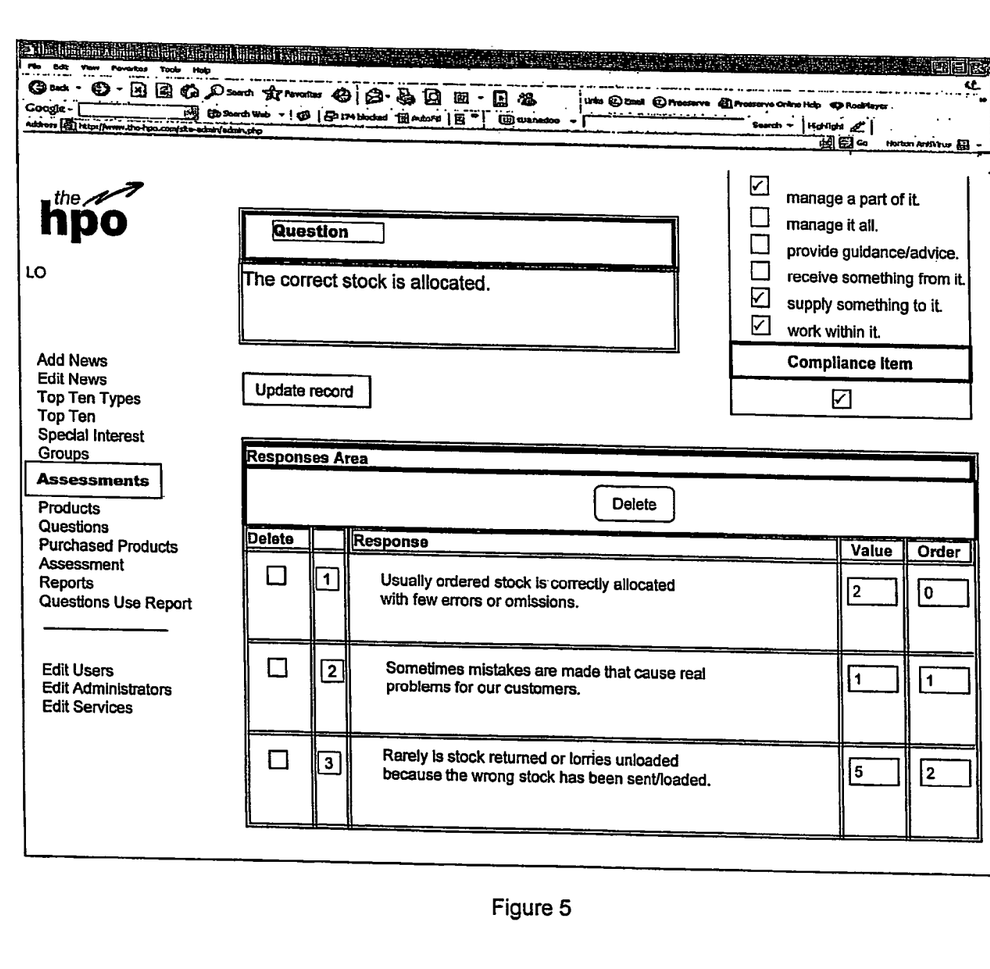

Next, for each statement or question in turn, the range of possible responses on offer is considered, and each is given a value or score to reflect its maturity of performance in the context of the statement or question. This may be input using the screen display shown in FIG. 5. FIG. 5 shows only three possible responses as having been input. In practice the "Response Area" of the screen will scroll down until all potential responses have been input and assigned a value or score. The right-hand column in FIG. 5, headed "Order", is a computer-generated numerical sequence, and is a randomised sequence in which the possible responses will be offered to the polled groups when the system is being used. As part of the completion of the screen shown in FIG. 5, the user will also input a check list of those groups who will be polled with that particular question. In FIG. 5, for example, it will be seen that the question or statement "The correct stock is allocated" is to be presented to those groups who manage a part of the system and to those groups who work within the system, but not to the other groups listed. Another relevant part of the set-up procedure is to decide whether a specific question or statement is one that reflects a compliance requirement issue, and if so the 'Compliance Item' box is ticked so that the mean response to this individual question or statement will be reported if low or non-compliant.

Figure 6A:
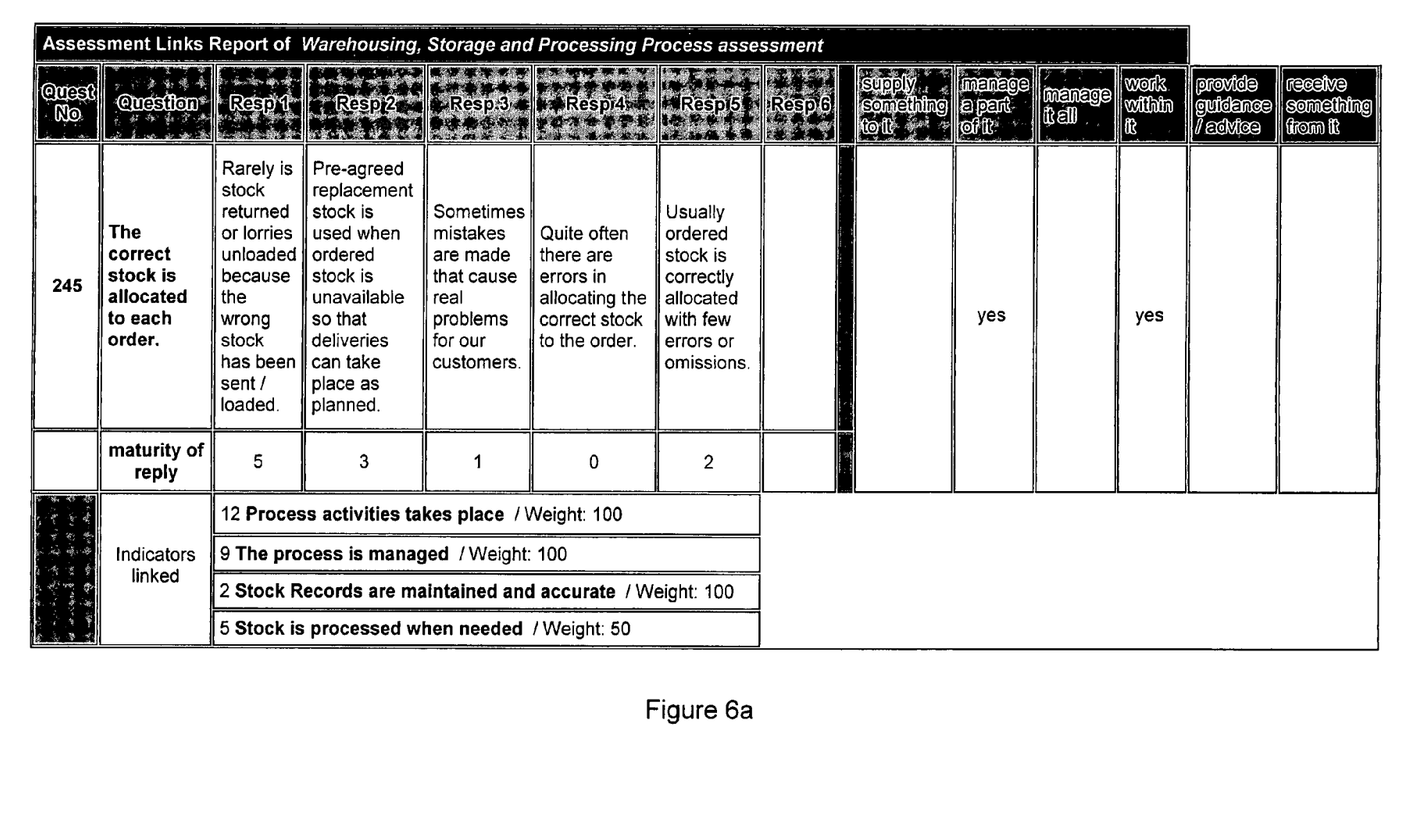
FIGS. 6a and 6b together are a sample from a programming report illustrating the creation of maturity values given to possible alternative responses to two questions or statements and the assignment of weightings between those questions and Performance Indicators to which they are linked.
Figure 6B:
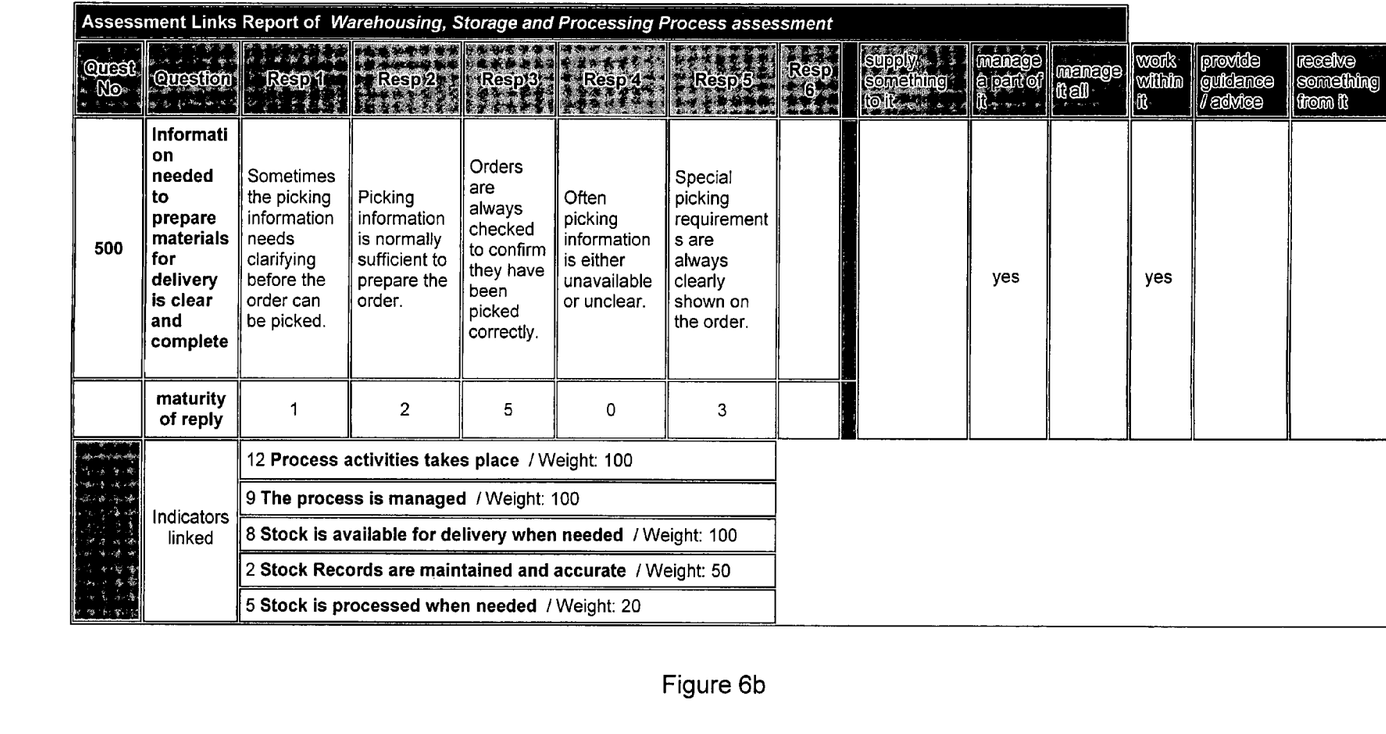

At this stage the configuration of the tool for collecting and analysing the data for assessing the performance of the warehousing aspect of the process is complete. The results of the above described configuration steps are summarised in FIGS. 6a and 6b. All that remains is the configuration of the central processing unit to generate reports which analyse and assess the cause of any failure of the process to attain target performance. Included within that central processing power is the ability to warn when the numbers of people in any group polled in respect of any question or statement falls below a statistically significant level, and the ability to present the report information in graphical or tabular form. The actual form of the report is very flexible because essentially the report is handling numerical data, with each item of numerical data being responsive to the maturity of the responses given by a particular group of people polled and the weighting given to the link between the question or statement under consideration and the Performance Driver or Drivers to which each individual question or statement is linked. As for all data held within the system, these report analysis templates can be secured through version control, to ensure consistency can be maintained over time.

The system can be configured to preserve the anonymity of those polled for responses, who may log into the system for example over the Internet by first giving a password to avoid fraud or multiple responses by a single person within a group.

The invention claimed is:

1. A performance analysis and assessment tool, responsive to subjective input data obtained from plural groups of people, for monitoring and evaluating any industrial or commercial process, activity or system against a set of Performance Drivers for the industrial or commercial process, activity or system and for assessing the efficiency, capability or sustainability of that process, activity or system as a result of the monitoring after analyzing the subjective input data to eliminate any subjective bias therein, comprising:

a central processor unit programmed with a plurality of predefined protocols to be followed in order that the industrial or commercial process, activity or system should comply with the Performance Drivers;

at least one remote terminal, accessible by the central processor unit to enable the central processor unit to collect performance and compliance data from people distributed between a diverse number of groups, irrespective of location, all involved in or having an interest in the effects and results of the industrial or commercial process, activity or system; and means within the central processor unit for analysing the performance and compliance data collected and for assessing the efficiency, capability and sustainability of the industrial or commercial process by:

analysing the Performance Drivers included within individual areas of the predefined protocols;

relating each such Performance Driver to one or more assessment topics;

identifying plural groups of people, each with a different input to or experience of the industrial or commercial process, activity or system, able to assess the performance and compliance data;

obtaining from people in those plural groups subjective responses, being Performance Indicators, to predefined statements or questions for the assessment topics;

assigning to each individual statement or question a maturity value indicating the relevance of the response elicited from that individual to the statement or question;

obtaining from the totality of the responses a mean response to the statement or question;

linking each of the statements or questions used to derive the performance and compliance data with achievement of one or more of the Performance Drivers;

providing a weighting between each of the statements or questions used to derive the performance and compliance data, and thus of the mean responses thereto, and each of the Performance Drivers with which it has been linked;

analysing the accumulated weighted performance and compliance data against the associated Performance Drivers; and from that analysis generating an assessment report that outlines overall and sub-group results against the Performance Drivers, assesses compliance against individual statements and indicates the potential risk or cause of any failure of the process, activity or system to attain its targets.

2. An assessment tool according to claim 1, wherein the plural groups of people able to assess the performance and compliance data include the entire workforce or a cross-section of the entire workforce involved in the commercial or industrial process, activity or system divided into statistically significant groups, together with suppliers, regulators or any people, stakeholders, interested parties or organisations affected by the industrial or commercial process, activity, system or product or users of the products produced by that process, activity or system.

3. An assessment tool according to claim 2, wherein each of the said plural groups of people contributes to an assessment by providing a view, knowledge, perception or experience of different elements of the performance and compliance consistent with their knowledge and experience of the industrial or commercial process, activity or system or the product of that process, activity or system.

4. An assessment tool according to claim 1, wherein the or each remote terminal is provided with a graphical user interface which represents the industrial or commercial process, activity or system, described in terms of its key processes linked to all related supporting information, including all those required for the application of standards, frameworks or other requirements, as a reference to the organisation's current operating practices and management system.

5. An assessment tool according to claim 4, wherein the or each graphical user interface is configured to present to specific groups of the people able to assess the performance and compliance data a range of predefined statements and responses.

6. An assessment tool according to claim 5, wherein the predefined responses for each statement or question include options for the users to select a single response and/or multiple responses, and the graphical user interface is configured to transfer the single or multiple responses once selected to the central processing unit for future analysis.

7. An assessment tool according to claim 5, wherein the or each graphical user interface is configured to permit the user to enter a free text response as an alternative to or in addition to the predefined responses presented to the users.

8. A performance analysis and assessment tool, responsive to subjective input data obtained from plural groups of people, for monitoring and evaluating any industrial or commercial process, activity or system against a set of Performance Drivers for the industrial or commercial process, activity or system and for assessing the efficiency, capability or sustainability of that process, activity or system as a result of the monitoring after analyzing the subjective input data to eliminate any subjective bias therein, comprising:

a central processor unit programmed with a plurality of predefined protocols to be followed in order that the industrial or commercial process, activity or system, should comply with the Performance Drivers;

at least one remote terminal, accessible by the central processor unit to enable the central processor unit to collect performance and compliance data from people distributed between a diverse number of groups, irrespective of location, all involved in or having an interest in the effects and results of the industrial or commercial process, activity or system; and means within the central processor unit for analysing the performance and compliance data collected and for assessing the efficiency, capability and sustainability of the industrial or commercial process by:

analysing the Performance Drivers included within individual areas of the predefined protocols;

relating each such Performance Driver to one or more assessment topics;

identifying plural groups of people, each with a different input to or experience of the industrial or commercial process, activity or system, able to assess the performance and compliance data;

obtaining from people in those plural groups subjective responses, being Performance Indicators, to predefined statements or questions for the assessment topics;

assigning to each individual statement or question a maturity value indicating the relevance of the response elicited from that individual to the statement or question;

obtaining from the totality of the responses a mean response to the statement or question;

linking each of the statements or questions used to derive the performance and compliance data with achievement of one or more of the Performance Drivers;

providing a weighting between each of the statements or questions used to derive the performance and compliance data, and thus of the mean responses thereto, and each of the Performance Drivers with which it has been linked;

analysing the accumulated weighted performance and compliance data against the associated Performance Drivers by applying a different predefined weighting between each item of performance and compliance data obtained from each specific user group and each specific one of the Performance Drivers to which it is linked; and from that analysis generating an assessment report that outlines overall and sub-group results against the Performance Drivers, assesses compliance against individual statements and indicates the potential risk or cause of any failure of the process, activity or system to attain its targets.

9. A performance analysis and assessment tool, responsive to subjective input data obtained from plural groups of people, for monitoring and evaluating any industrial or commercial process, activity or system against a set of Performance Drivers for the industrial or commercial process, activity or system and for assessing the efficiency, capability or sustainability of that process, activity or system as a result of the monitoring after analyzing the subjective input data to eliminate any subjective bias, comprising:

a central processor unit programmed with a plurality of predefined protocols to be followed in order that the industrial or commercial process, activity or system, should comply with the Performance Drivers;

at least one remote terminal, accessible by the central processor unit to enable the central processor unit to collect performance and compliance data from people distributed between a diverse number of groups, irrespective of location, all involved in or having an interest in the effects and results of the industrial or commercial process, activity or system; and means within the central processor unit for analysing the performance and compliance data collected and for assessing the efficiency, capability and sustainability of the industrial or commercial process by:

analysing the Performance Drivers included within individual areas of the predefined protocols;

relating each such Performance Driver to one or more assessment topics;

identifying plural groups of people, each with a different input to or experience of the industrial or commercial process, activity or system able to assess the performance and compliance data;

obtaining from people in those plural groups subjective responses, being Performance Indicators, to predefined statements or questions for the assessment topics;

assigning to each individual statement or question a maturity value indicating the relevance of the response elicited from that individual to the statement or question;

obtaining from the totality of the responses a mean response to the statement or question;

linking each of the statements or questions used to derive the performance and compliance data with achievement of one or more of the Performance Drivers;

providing a weighting between each of the statements or questions used to derive the performance and compliance data, and thus of the mean responses thereto, and each of the Performance Drivers with which it has been linked;

analysing the accumulated weighted performance and compliance data against the associated Performance Drivers by bringing together the collected data from a number of assessments and means for reporting on them collectively; and from that analysis generating an assessment report that outlines overall and sub-group results against the Performance Drivers, assesses compliance against individual statements and indicates the potential risk or cause of any failure of the process, activity or system to attain its targets.

10. An assessment tool according to claim 8, wherein the or each remote terminal is provided with a graphical user interface which represents the industrial or commercial process, activity or system, described in terms of its key processes linked to all related supporting information, including all those required for the application of standards, frameworks or other requirements, as a reference to the organisation's current operating practices and management system.

11. An assessment tool according to claim 8, wherein the or each remote terminal is provided with a graphical user interface which represents the industrial or commercial process, activity or system, described in terms of its key processes linked to all related supporting information, including all those required for the application of standards, frameworks or other requirements, as a reference to the organisation's current operating practices arid management system.

12. An assessment tool according to claim 10, wherein the means for analysing the accumulated weighted performance and compliance data and associated Performance Drivers to which they are linked includes means for bringing together the collected data from a number of assessments and means for reporting on them collectively.

13. A performance analysis assessment method, responsive to subjective input data obtained from plural groups of people, for monitoring and evaluating any industrial or commercial process, activity or system or the personnel carrying out that process, activity or system against a set of Performance Drivers for the industrial or commercial process, activity or system; and for assessing the efficiency, capability or sustainability of that process, activity or system as a result of the monitoring after analyzing the subjective input data to eliminate any subjective bias therein, comprising:

programming into a central processor unit a plurality of predefined protocols to be followed in order that the industrial or commercial process, activity or system should comply with the Performance Drivers;

collecting, through at least one remote terminal that is accessible by the central processor unit, performance and compliance data from people distributed between a diverse number of groups all involved with or having an interest in the effects and results of the industrial or commercial process, activity or system; and analysing, within the central processor unit, the performance and compliance data collected and assessing the efficiency, capability and sustainability of the industrial or commercial process by:

analysing the performance Drivers included within individual areas of the predefined protocols;

relating each such Performance Driver to one or more assessment topics;

identifying plural groups of people, each with a different input to or experience of the industrial or commercial process, activity or system, able to assess the performance and compliance data;

obtaining from people in those plural groups subjective responses, being Performance Indicators, to predefined statements or questions for the assessment topics;

assigning to each individual assessment a maturity value indicating the relevance of the response elicited from that individual to the statement or question;

obtaining from the totality of the responses a mean response to the statement or question;

linking each of the statements or questions used to derive the performance and compliance data with achievement of one or more of the Performance Drivers;

providing a weighting between each of the statements or questions used to derive the performance and compliance data, and thus of the mean responses thereto, and each of the Performance Drivers with which it has been linked; and analysing the accumulated weighted performance and compliance data; and from that analysis generating an assessment report that outlines overall and sub-group results against the Performance Drivers, assesses compliance against individual statements and indicates the potential risk or cause of any failure of the process, activity or system to attain its targets.

14. A computer readable medium carrying a computer program, responsive to subjective input data obtained from plural groups of people, for carrying out a performance analysis assessment method for monitoring and evaluating any industrial or commercial process, activity or system or the personnel carrying out that process, activity or system against a set of Performance Drivers for the industrial or commercial process, activity or system; and for assessing the efficiency, capability or sustainability of that process, activity or system as a result of the monitoring after analyzing the subjective input data to eliminate any subjective bias therein, comprising:

screen prompts for enabling a computer operator to program into a central processor unit a plurality of predefined protocols to be followed in order that the industrial or commercial process, activity or system should comply with the Performance Drivers;

screen prompts for enabling a computer operator to collect, through at least one remote terminal that is accessible by the central processor unit, performance and compliance data from people distributed between a diverse number of groups all involved with or having an interest in the effects and results of the industrial or commercial process, activity or system; and means for analysing, within the central processor unit, the performance and compliance data collected and assessing the efficiency, capability and sustainability of the industrial or commercial process by:

analysing the performance Drivers included within individual areas of the predefined protocols;

relating each such Performance Driver to one or more assessment topics;

identifying plural groups of people, each with a different input to or experience of the industrial or commercial process, activity or system, able to assess the performance and compliance data;

obtaining from people in those plural groups subjective responses, being Performance Indicators, to predefined statements or questions for the assessment topics;

assigning to each individual assessment a maturity value indicating the relevance of the response elicited from that individual to the statement or question;

obtaining from the totality of the responses a mean response to the statement or question;

linking each of the statements or questions used to derive the performance and compliance data with achievement of one or more of the Performance Drivers;

providing a weighting between each of the statements or questions used to derive the performance and compliance data, and thus of the mean responses thereto, and each of the Performance Drivers with which it has been linked; and analysing the accumulated weighted performance and compliance data; and from that analysis generating an assessment report that outlines overall and sub-group results against the Performance Drivers, assesses compliance against individual statements and indicates the potential risk or cause of any failure of the process, activity or system to attain its targets.

15. A carrier wave carrying a signal enabling a performance analysis assessment method, responsive to subjective input data obtained from plural groups of people, for monitoring and evaluating any industrial or commercial process, activity or system or the personnel carrying out that process, activity or system against a set of Performance Drivers for the industrial or commercial process, activity or system; and for assessing the efficiency, capability or sustainability of that process, activity or system as a result of the monitoring after analyzing the subjective input data to eliminate any subjective bias therein, comprising:

means for generating screen prompts for enabling a computer operator to program into a central processor unit a plurality of predefined protocols to be followed in order that the industrial or commercial process, activity or system should comply with the Performance Drivers;

means for generating screen prompts for enabling a computer operator to collect, through at least one remote terminal that is accessible by the central processor unit, performance and compliance data from people distributed between a diverse number of groups all involved with or having an interest in the effects and results of the industrial or commercial process, activity or system; and means for enabling the central processor unit to analyze the performance and compliance data collected and to assess the efficiency, capability and sustainability of the industrial or commercial process by:

analysing the performance Drivers included within individual areas of the predefined protocols;

relating each such Performance Driver to one or more assessment topics;

identifying plural groups of people, each with a different input to or experience of the industrial or commercial process, activity or system, able to assess the performance and compliance data;

obtaining from people in those plural groups subjective responses, being Performance Indicators, to predefined statements or questions for the assessment topics;

assigning to each individual assessment a maturity value indicating the relevance of the response elicited from that individual to the statement or question;

obtaining from the totality of the responses a mean response to the statement or question;

linking each of the statements or questions used to derive the performance and compliance data with achievement of one or more of the Performance Drivers;

providing a weighting between each of the statements or questions used to derive the performance and compliance data, and thus of the mean responses thereto, and each of the Performance Drivers with which it has been linked; and analysing the accumulated weighted performance and compliance data; and from that analysis generating an assessment report that outlines overall and sub-group results against the Performance Drivers, assesses compliance against individual statements and indicates the potential risk or cause of any failure of the process, activity or system to attain its targets.

* * * * *